(12) United States Patent
Derra et al.

(10) Patent No.: US 7,216,752 B2
(45) Date of Patent: May 15, 2007

(54) HYDRAULIC CYLINDER

(75) Inventors: Hubert Derra, Kirchlauter (DE);
Dieter Grimmer, Eltmann (DE);
Wolfgang Schor, Ebern (DE); Robert Müller, Maroldsweisach (DE)

(73) Assignee: FTE automotive GmbH, Ebern (DE)

( * ) Notice: Subject to any disclaimer, the term of this patent is extended or adjusted under 35 U.S.C. 154(b) by 232 days.

(21) Appl. No.: 10/934,148

(22) Filed: Sep. 3, 2004

(65) Prior Publication Data

US 2005/0051407 A1 Mar. 10, 2005

(30) Foreign Application Priority Data

Sep. 5, 2003 (DE) ................................ 103 41 470

(51) Int. Cl.
*F16B 15/26* (2006.01)

(52) U.S. Cl. ........................ 192/85 C; 60/533; 92/23

(58) Field of Classification Search ................ None
See application file for complete search history.

(56) References Cited

U.S. PATENT DOCUMENTS

| | | | |
|---|---|---|---|
| 4,454,632 A * | 6/1984 | Nix et al. | 24/16 PB |
| 4,557,361 A * | 12/1985 | Nix et al. | 192/85 C |
| 4,581,979 A * | 4/1986 | Compton et al. | 92/23 |
| 4,665,802 A * | 5/1987 | Barker et al. | 92/23 |
| 4,766,804 A | 8/1988 | Barker | |
| 5,002,169 A * | 3/1991 | Barker | 192/85 C |
| 5,836,235 A | 11/1998 | Rudiger et al. | |
| 6,460,449 B2 * | 10/2002 | Higuchi et al. | 92/23 |
| 6,772,672 B2 * | 8/2004 | Kosugi et al. | 92/23 |
| 2002/0175034 A1 | 11/2002 | Sander et al. | |

FOREIGN PATENT DOCUMENTS

| | | |
|---|---|---|
| DE | 195 16 392 A1 | 11/1996 |
| EP | 1 329 640 A2 | 7/2003 |
| GB | 2 241 298 A | 8/1991 |

* cited by examiner

*Primary Examiner*—Saul Rodriguez
(74) *Attorney, Agent, or Firm*—Reising Ethington Barnes Kisselle, P.C.

(57) ABSTRACT

A hydraulic cylinder (10) is disclosed comprising a cylinder housing (12) with a housing bore (14), a piston (16) held longitudinally displaceably in the housing bore, a piston rod (18) allocated to the piston and a fixing element (20) which before a first cylinder operation is detachably connected with the piston rod and fixes this in a predetermined stroke position in relation to the cylinder housing and is designed to release the piston rod in relation to the cylinder housing on the first cylinder operation. According to the invention, before the first cylinder operation the fixing element in a first position is detachably connected with a center area (22) of the piston rod and on cylinder first operation can be moved from the first position to a second position area (24), in particular stationary in relation to the piston rod, in which it can be fixed for further cylinder operations. The result is a simply designed hydraulic cylinder in which the fixing element provided for temporary tying of the piston rod in particular leaves untouched the end of the piston rod facing away from the piston and also does not hinder further the operation of the hydraulic cylinder.

22 Claims, 6 Drawing Sheets

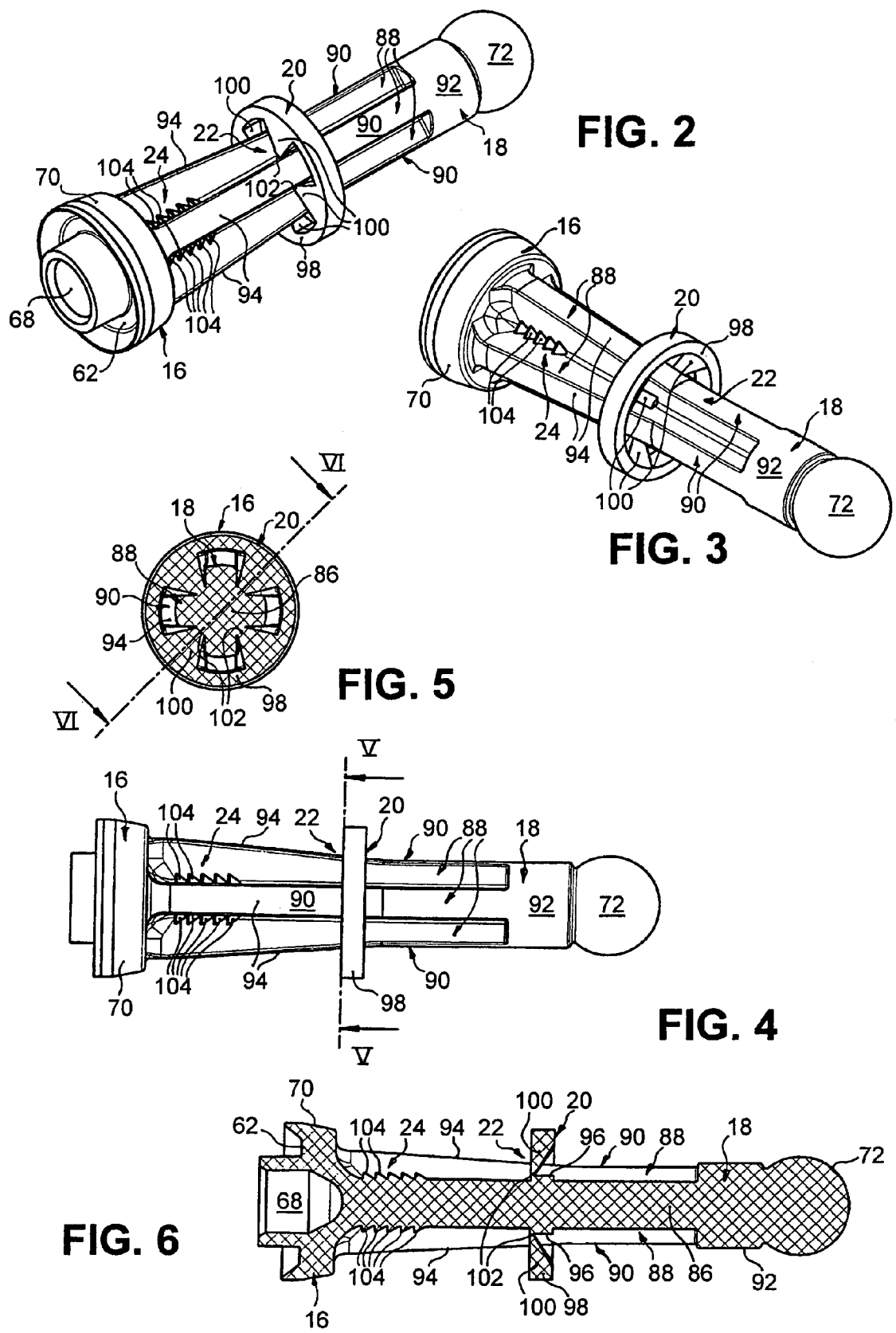

HYDRAULIC CYLINDER

FIELD OF THE INVENTION

The invention relates to a hydraulic cylinder and in particular the invention relates to a slave cylinder for a hydraulic clutch control for motor vehicles as used in large numbers in the automotive industry.

BACKGROUND OF THE INVENTION

A conventional hydraulic clutch control for motor vehicles has a master cylinder which is connected to a reservoir filled with hydraulic fluid. The master cylinder has a cylinder housing in whose housing bore a piston is held longitudinally displaceably. The master cylinder piston in the housing bore of the cylinder housing defines a pressure chamber and by means of a clutch pedal or an electric motor drive can be mechanically pressurized by an activating force. The pressure chamber of the master cylinder is hydraulically connected via a pressure line with a pressure chamber of a slave cylinder so that the pressure generated in the pressure chamber of the master cylinder by pressing the clutch pedal or electric motor movement of the master cylinder piston can be transferred via the fluid column in the pressure line to the pressure chamber of the slave cylinder. The slave cylinder also has a cylinder housing with a housing bore in which is held longitudinally displaceably a piston which delimits the pressure chamber of the slave cylinder and can thus be pressurized with the pressure generated in the master cylinder. Allocated to the slave cylinder piston is a piston rod which acts on a clutch lever which in turn is actively connected with the clutch release bearing. As a result the clutch release bearing can, via the slave cylinder piston, be pressurized with an activation force in order, via a release mechanism, to separate the clutch pressure plate from the clutch carrier plate and hence the engine from the gearbox of the motor vehicle.

In particular in connection with hydraulic clutch controls which are supplied to the assembly line of the motor vehicle manufacturer as preassembled units of master cylinder, reservoir, pressure line and slave cylinder, prefilled with hydraulic fluid, the prior art (e.g. U.S. Pat. No. 4,665,802, U.S. Pat. No. 4,766,804, GB 2 241 298 A) has already proposed temporarily tying the piston rod of the slave cylinder in a predetermined stroke position in relation to the cylinder housing of the slave cylinder in order to avoid overfilling of the hydraulic clutch control, for its transport and to simplify installation of the unit in the motor vehicle.

Thus the GB 2 241 298 A reference discloses a slave cylinder with a cylinder housing having a housing bore, a piston held longitudinally displaceably in the housing bore and a piston rod allocated to the piston, in which slave cylinder is provided a fixing element which before first operation of the slave cylinder is detachably connected with the piston rod and fixes this in a predetermined stroke i.e. axial position in relation to the cylinder housing, and which furthermore is designed on first operation of the slave cylinder to release the piston rod in relation to the cylinder housing. In this prior art the fixing element has a ring flange section which is inserted in a stepped end section of the housing bore of the cylinder housing at its open end and fixed there by means of a locking ring. From the ring flange section of the fixing element, several thin fixing strips extend radially inwards to the end of the piston rod facing away from the piston where they transform as one piece into the piston rod head in order to tie the piston rod in relation to the cylinder housing in a predetermined stroke position before first operation of the slave cylinder. When the slave cylinder is activated for the first time, the fixing strips on the ring flange section tear off and release the piston rod.

Although in relation to previous solutions (e.g. U.S. Pat. No. 4,665,802, U.S. Pat. No. 4,766,804) in which the fixing element had a separate retaining cap placed on the piston rod head which was detachably clamped by means of fixing strips in relation to the outer periphery of the cylinder housing in order to hold the piston rod in a predetermined stroke position in relation to the cylinder housing, this prior art has the advantage that assembly of the slave cylinder is considerably easier because of the one-piece design of the fixing element and piston rod, the generic-state of the art requires further improvement in particular in functional respects. In the generic prior art it is not possible to attach to the head of the piston rod facing away from the piston a slip cup or dust protection cap swivellable in relation to the piston rod, as is known for example from the prior art according to DE 195 16 392 A1 or DE 100 38 012 A1. Also in operation of the slave cylinder problems can arise in that the fixing strips formed on the piston rod head and torn away from the ring flange section of the fixing element hinder the function of the slave cylinder as they obstruct any necessary stroke-dependent angular movement of the piston rod in relation to the center axis of the cylinder housing.

What is needed is a hydraulic cylinder designed as simply as possible, in particular a slave cylinder for a hydraulic clutch control for motor vehicles, in which before first operation of the hydraulic cylinder the piston rod is tied in a predetermined stroke position in relation to the cylinder housing and is released on first operation of the hydraulic cylinder without the problems outlined above in the discussion of the prior art.

SUMMARY OF THE INVENTION

According to the invention, in a hydraulic cylinder, in particular a slave cylinder for a hydraulic clutch control for motor vehicles which has a cylinder housing with a housing bore, a piston held longitudinally displaceably in the housing bore, a piston rod allocated to the piston and a fixing element which before first operation of the hydraulic cylinder is detachably connected with the piston rod and fixes the piston rod in a predetermined stroke position in relation to the cylinder housing and is designed, on first operation of the hydraulic cylinder, to release the piston rod in relation to the cylinder housing, the fixing element before first operation of the hydraulic cylinder in a first position is detachably connected with a center area of the piston rod and on first operation of the hydraulic cylinder can be moved from the first position into a second position area, stationary in relation to the piston rod or cylinder housing, in which it can be fixed for further operations of the hydraulic cylinder.

This temporary tying of the piston rod in relation to the cylinder housing allows for example the hydraulic cylinder according to the invention to be mounted in its location for use essentially force-free because any spring provided in the hydraulic cylinder to pretension the piston in the control device does not have to be compressed by pushing the piston rod into the cylinder housing and hence moving the piston in the cylinder housing, rather the piston rod in relation to the cylinder housing can be held temporarily against the force of the pretension spring by means of the fixing element in a predetermined stroke position favorable for assembly. Other applications of the invention comprise the avoidance, on prefilling, of overfilling of a hydraulic system having a hydraulic cylinder according to the invention, where the fixing element ensures that before first operation the hydraulic cylinder can only hold a predetermined quantity of hydraulic fluid, and securing the hydraulic cylinder according to the invention against transport damage, where the fixing element during transport of the hydraulic cylinder prevents excessive protrusion of the piston rod from the cylinder housing.

The center area of the piston rod with which the fixing element is detachably connected before first operation of the hydraulic cylinder, for the purposes of the present description means the area of the piston rod which lies between the end areas of the piston rod, where the piston rod is actively connected with the piston or clutch lever in the case of a clutch slave cylinder. The area of the piston rod which is not one of its end areas, where the detachable connection between the fixing element and piston rod can lie, depending on the requirements, centrally in the center area or closer to the one or the other end area of the piston rod. Because the fixing element acts on this center area of the piston rod before first operation of the hydraulic cylinder according to the invention, the piston rod end facing away from the piston remains free in all cases so that here depending on the requirements, during or before assembly of the hydraulic cylinder at the point of use a slip cup, dust protection cap or similar can easily be attached.

A further essential basic concept of the invention is that for fixing and positioning the piston rod in relation to the cylinder housing, before first operation of the hydraulic cylinder the fixing element lies in a first position and on first operation of the hydraulic cylinder is moved from this first position into a second position area different from the first position in Which the fixing element is fixed i.e. remains for further operations of the hydraulic cylinder. Thus it is possible to move the fixing element on first operation of the hydraulic cylinder from one function area of the hydraulic cylinder in which it would otherwise hinder any angular movement of the piston rod in relation to the center axis of the cylinder housing and/or could cause undesirable friction noise, and in addition to fix or secure the fixing element outside this function area so that it cannot hinder the function of the hydraulic cylinder even on further operations.

In particular to simplify assembly of the hydraulic cylinder, in a further refinement of the inventive concept the fixing element can be formed of one piece with the piston rod. Such a one-piece design of fixing element and piston rod can e.g. be achieved in production particularly simply by injection molding of plastic. Alternatively the fixing element can also be a component separate from the piston rod. The latter design has the advantage that modular solutions are possible in which identically designed fixing elements can be used in different hydraulic cylinders with different pistons and/or piston rods.

Advantageously the fixing element can be formed annular and surround the piston rod. With suitable dimensioning of the fixing element in the radial direction it is therefore possible, as well as the temporary tying of the piston rod in a predetermined stroke position, to fix the piston rod before first operation of the hydraulic cylinder in a predetermined angular position in relation to the center axis of the housing bore in the cylinder housing in order to facilitate assembly of the hydraulic cylinder at the point of use.

The connection detachable on first operation of the hydraulic cylinder between the fixing element and the piston rod can be designed in various ways. In a first preferred alternative the detachable connection between the fixing element and the piston rod can be produced in particular by a material connection via at least one breaking point between the fixing element and the piston rod or a carrier holding the fixing element in a first position on the piston rod. These breaking points break on first operation of the hydraulic cylinder so that the piston rod—where applicable with the carrier for the fixing element—becomes detached from the fixing element.

In particular for production reasons it is advantageous here if the fixing element has an outer ring and a plurality of connecting webs extending radially inwards from the outer ring, which before first operation of the hydraulic cylinder are each connected via a breaking point as one piece with the piston rod or a carrier ring provided inside the outer ring as the carrier which is arranged on a seat on the piston rod in a first position. In the latter variant the carrier ring can be arranged concentrically inside the outer ring. This guarantees in a simple manner that before first operation of the hydraulic cylinder, the fixing element holds the piston rod in a position essentially aligned with the center axis of the housing bore in the cylinder housing, which facilitates assembly of the hydraulic cylinder at the point of use because the piston rod need not be aligned manually in order e.g. in the case of a clutch slave cylinder to be able to thread the end of the piston rod facing away from the piston into an allocated recess on the clutch lever. Depending on the installation requirements here designs are also possible in which the carrier ring is arranged with an axial or angular offset to the outer ring of the fixing element within the outer ring in order before first operation of the hydraulic cylinder to hold the piston rod at a predetermined angle in relation to the center axis of the housing bore in the cylinder housing. It can be suitable here if the carrier ring is arranged rotationally stationary in relation to the piston rod on the seat on the piston rod.

For the design of the above-mentioned breaking points, in principle an adhesive joint with defined adhesion between the connecting webs and the piston rod or carrier ring would be conceivable. However because it is simpler and cheaper to produce, a design of breaking points is preferred in which the breaking point is formed by material connection via a cross section reduction of the connecting web concerned between the outer ring and the piston rod or carrier ring.

As an alternative to a detachable in particular material connection between the fixing element and the piston rod by means of breaking points, the detachable connection between the fixing element and the piston rod depending on the requirements can be produced in particular as a form fit by means of complementary intermeshing structures on the fixing element on the piston rod, with a resilient design of fixing element and/or piston rod such that on application of a force acting in the axial direction of the piston rod and exceeding a predetermined force, the structures move out of engagement under a radial deflection movement of the fixing element and/or piston rod. Here in a simple design the piston rod in its center area can be fitted with a radial groove which has a semi-circular cross section and in which before first operation of the hydraulic cylinder there engages by form fit a complementary-shaped ring section of the fixing element, where the fixing element has a through slot in the longitudinal direction in order to be able to spring radially outwards. Thus the piston rod, up to the additional radial groove in its center area, can advantageously remain unchanged in relation to the proven conventional piston rods.

It is further suitable if the fixing element in its first position lies on an abutment surface formed on a ring collar of the cylinder housing or an insert applied there at an open end of the housing bore through which the piston rod extends.

If furthermore the fixing element second position area, stationary in relation to the piston rod, lies close to the piston between its first position on the piston rod and the piston, advantageously the piston rod has a particularly great angular mobility in the housing bore of the cylinder housing without the angular movement of the piston rod being hindered by the fixing element fixed in its second position. Alternatively for example if a particularly great angular mobility of the piston rod is not necessary or desirable, the fixing element second position area, stationary in relation to the cylinder housing, can lie at an open end of the housing bore in the cylinder housing through which the piston rod extends.

In a further refinement of the inventive thought, in the fixing element second position area, stationary in relation to the piston rod or cylinder housing, a structure can be formed with which a structure where applicable of complementary shape on the fixing element can be brought into form fit engagement in order to fix the fixing element for further operations of the hydraulic cylinder. Such a form fit fixing of the fixing element in its second position area stationary in relation to the piston rod or cylinder housing can—compared with a pressure adhesion joint also possible here—advantageously be implemented constructionally at less cost.

Thus in a first preferred alternative for a form fit definition of the fixing element on the piston rod on first operation of the hydraulic cylinder, in the fixing element second position area stationary in relation to the piston rod, a plurality of locking tabs can be provided with which can engage fixing element connecting webs extending radially inwards from the outer ring of the fixing element which are therefore formed resilient in the axial direction of the fixing element. Such locking tabs can be designed simply if the piston rod is injection molded of plastic. Instead of or in addition to a resilient design of the fixing element connecting webs, in principle here the outer ring of the fixing element could also have a through-slot in its longitudinal direction or a mesh or grid-like design in order to allow a radial elasticity of the fixing element and hence locking of the fixing element connecting webs with the locking tabs on the piston rod.

In a second advantageous alternative for a form fit fixing of the fixing element on the piston rod on first operation of the hydraulic cylinder, in the fixing element second position area stationary in relation to the piston rod, the piston rod can be fitted with a peripheral radial groove in which the fixing element can snap lock, for which the fixing element is fitted with a through slot in its longitudinal direction while the piston rod has at least one slope which rises towards the second position area stationary in relation to the piston rod and by means of which the fixing element on the first operation of the hydraulic cylinder can spring radially to create the snap connection. Here too the fixing element instead of the slot can in principle have a mesh or grid-like design in order to allow a radial springing of the fixing element, which is however less preferable because of the greater technical complexity required in production.

If the second position area for the fixing element is not stationary in relation to the piston rod but is stationary in relation to the cylinder housing, e.g. to avoid any movement of the fixing element on each piston movement, an arrangement for a form fit fixing of the fixing element to the cylinder housing on first operation of the hydraulic cylinder can advantageously be achieved if the cylinder housing at an open end of the housing bore through which the piston rod extends or an insert attached there, in the fixing element second position area stationary in relation to the cylinder housing, is fitted with an undercut in which can be snap-locked a locking tab formed on the fixing element, the fixing element again being fitted with a through slot in its longitudinal direction while on the cylinder housing side is provided a joint slope which rises towards the second cylinder housing stationary position area and via which the fixing element can be sprung radially on first operation of the hydraulic cylinder to create the snap-lock connection.

Furthermore the fixing element in its second position stationary in relation to the piston rod or cylinder housing can serve as a stop element which co-operates with a counter-stop stationary in relation to the cylinder housing or piston rod in order to limit the stroke of the piston in the housing bore of the cylinder housing so that the fixing element advantageously fulfills a further function.

As already discussed above finally a simple and low cost production is achieved if the fixing element-is made of plastic, in particular is injection molded therefrom.

BRIEF DESCRIPTION OF DRAWINGS

Reference is now made to the accompanying drawings in which.

DETAILED DESCRIPTION OF THE PREFERRED EMBODIMENTS

It should first be noted here that in the figures all elastomer components, namely sealing rings, O-rings and boots, are shown in undistorted state to simplify the representation. Therefore in the figures these components sometimes overlap with adjacent components. In fact there the elastomer component concerned lies on the adjacent component with corresponding distortion.

Figure 1:
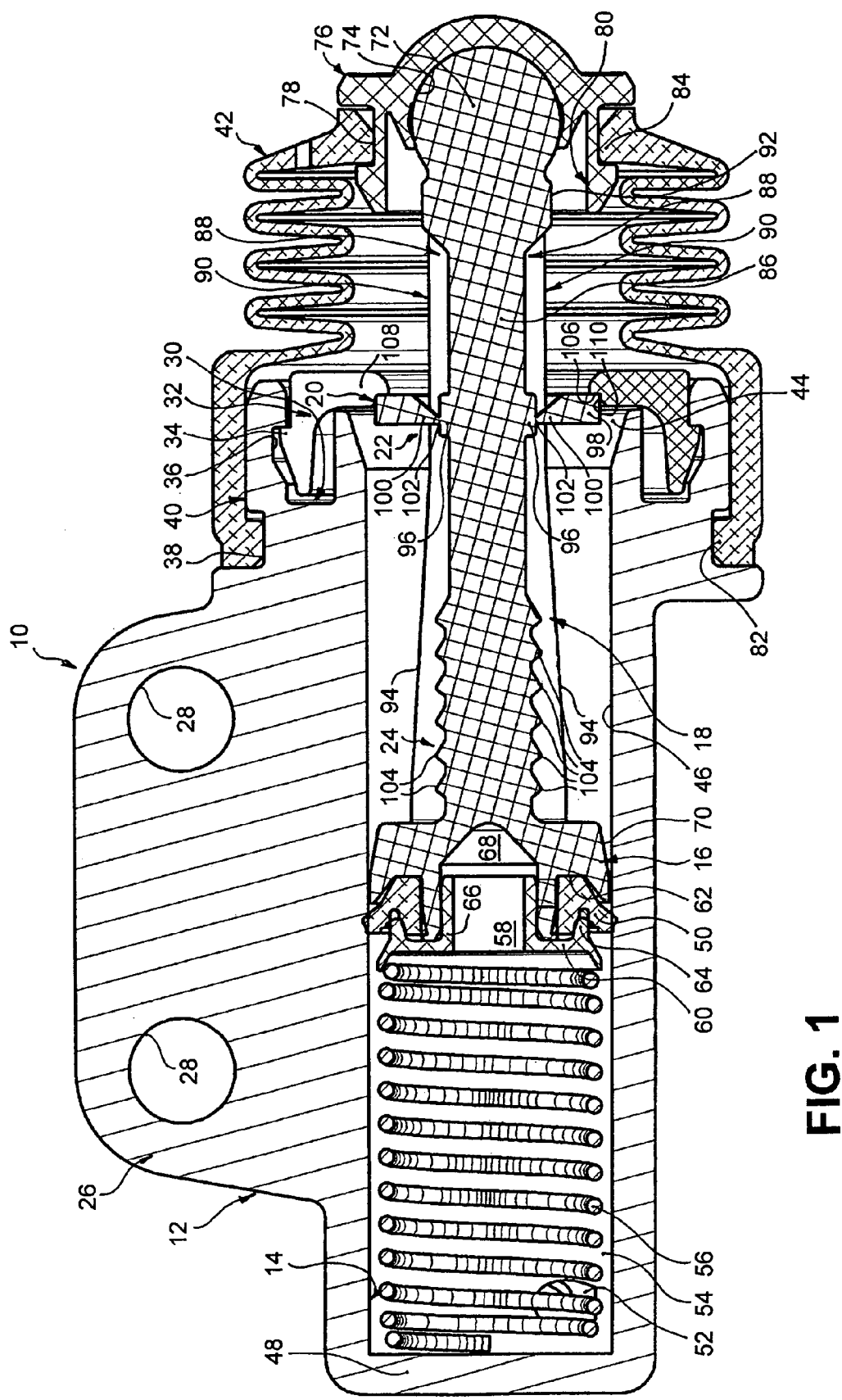
FIG. 1 a longitudinal section view, enlarged in scale in relation to the actual dimensions, of a slave cylinder with a cylinder housing and piston held therein for a hydraulic clutch control for motor vehicles according to a first embodiment of the invention in the uninstalled state before first operation, in which a piston rod formed as one piece with the piston, by means of a fixing element connected detachably with the piston rod via breaking points, is temporarily fixed in a predetermined stroke position in relation to the cylinder housing, FIG. 2 a perspective view of the component of the slave cylinder in FIG. 1 forming the piston, piston rod and fixing element, with its piston-side end in the foreground, in a design slightly modified in relation to the view in FIG. 1, FIG. 3 a perspective view of the component according to FIG. 2 forming the piston, piston rod and fixing element, with its end facing away from the piston in the foreground, FIG. 4 a side view of the component according to FIG. 2 forming the piston, piston rod and fixing element, FIG. 5 a section view of the component according to FIG. 2 forming the piston, piston rod and fixing element along cut line V—V in FIG. 4, FIG. 6 a longitudinal section view of the component according to FIG. 2 forming the piston, piston rod and fixing element along cut line VI—VI in FIG. 5, FIG. 7 a longitudinal section view, enlarged in scale in relation to the actual dimensions and broken away on one side, of a slave cylinder having a cylinder housing and piston held therein for a hydraulic clutch control for motor vehicles according to a second embodiment of the invention, in uninstalled state before its first operation, in which a piston rod formed as one piece with the piston, by means of a separate fixing element held detachably on the piston rod via a carrier ring, is temporarily tied in a predetermined stroke position in relation to the cylinder housing, where the dotted lines indicate the fixing element in its second position which is stationary in relation to the piston rod and into which the fixing element can be moved-on first operation of the slave cylinder, FIG. 8 a side view of the component of the slave cylinder according to FIG. 7 comprising the piston, piston rod, fixing element, its carrier ring, a sealing element and a centering element for this, in a scale reduced in relation to the view in FIG. 7, FIG. 9 a perspective view of the component of the slave cylinder according to FIG. 7 forming the fixing element and its carrier ring in a scale enlarged in relation to FIG. 7, where the component is shown in its state before first operation of a slave cylinder, in which the fixing element and carrier ring are detachably connected together by means of breaking points, FIG. 10 a top view of the component according to FIG. 9 forming the fixing element as its carrier ring, FIG. 11 a longitudinal section view of the component according to FIG. 9 forming the fixing element and carrier ring along cut line XI—XI in FIG. 10, FIG. 12 a longitudinal section view of the component according to FIG. 9 forming the fixing element and its carrier ring along the cut line XII—XII in FIG. 10, FIG. 13 a longitudinal section view, enlarged in scale in relation to the actual dimensions and broken away on both sides, of a slave cylinder having a cylinder housing and piston held therein for a hydraulic clutch control for motor vehicles according to a third embodiment of the invention before its first operation, in which a piston rod formed of one piece of the piston is temporarily fixed in a predetermined stroke position in relation to the cylinder housing by means of a separate fixing element engaging detachably in a radial groove in the piston rod, FIG. 14 a longitudinal section view, enlarged in relation to the actual dimensions and broken away on both sides, of the slave cylinder according to FIG. 13 after its first operation, in which the fixing element has moved out of engagement with the radial groove on the piston rod and is in a second position which is stationary in relation to the cylinder housing on a locking element fixed to the cylinder housing and into which the fixing element was moved on first operation of the slave cylinder, FIG. 15 a top view of the fixing element of the slave cylinder according to FIG. 13, FIG. 16 a longitudinal section view of the fixing element of the slave cylinder according to FIG. 13 along cut line XVI—XVI in FIG. 15, and FIG. 17 a longitudinal section view of the locking element of the slave cylinder according to FIG. 13 which holds the fixing element in its second position stationary in relation to the cylinder housing.

FIG. 1 now shows as an example of a hydraulic cylinder namely a slave cylinder 10 for a hydraulic clutch control for motor vehicles which in the embodiment shown has a metal cylinder housing 12 in which is inserted starting from one face a housing bore 14 formed as a blind bore. In the housing bore 14 in the embodiment shown is held longitudinally displaceably a piston 16 which is made of a plastic and to which is allocated a piston rod 18. As will be described below, the slave cylinder 10 also has a fixing element 20 which before first operation of the slave cylinder 10 is detachably connected with the piston rod 18 and fixes this in a predetermined stroke position in relation to the cylinder housing 12 and is designed on first operation of the slave cylinder 10 to release the piston rod 18 in relation to the cylinder housing 12. It is essential that the fixing element 20 as shown in FIG. 1, before first operation of the slave cylinder 10, is detachably connected with a center area 22 of the piston rod 18 in a first position and on first operation of the slave cylinder 10 can be moved from this first position into a second position area 24, in the embodiment shown stationary in relation to the piston rod (or alternatively stationary in relation to the housing), in which position the fixing element 20 can be fixed for further operations of the slave cylinder 10 in order to remain there, as will be explained in more detail below.

According to FIG. 1 the cylinder housing 12 on the outer periphery side has a fixing flange 26 for assembly of the slave cylinder 10 in the motor vehicle, which flange has two fixing bores 28 through which in the assembled state of the slave cylinder 10 extend e.g. bolts (not shown) which serve to hold the slave cylinder 10 for example on a gearbox wall (not shown) in the motor vehicle. At its open end on the right in FIG. 1, the cylinder housing 12 is also fitted with an annular recess 30 which serves for centering and fixing an annular locking element 32, in the embodiment shown also made of plastic, through which extends the piston rod 18 and which prevents inter alia the piston rod 16 being extracted from the housing bore 14. In the annular recess 30 is fixed, resistant to tension and compression, the slotted locking element 32 of essentially L-shaped cross section by means of a peripheral tab 34 attached to its longer leg on the outer periphery side, which tab engages in an undercut on a cut-out 36 provided in the annular recess 30. The cylinder housing 12 further has, in the area of its open end on the right in FIG. 1, on its outer periphery side, a fixing section 40 fitted with a radial groove 38 for a flexible elastomeric boot 42 known in itself which protects the moving parts of the slave cylinder 10 from the environment. Starting from the open end of the slave cylinder housing 12, the housing bore 14 extending to the left in FIG. 1 first has a conical joint slope 44 for the piston 16 and next to this a cylindrical section 46 which ends at a flat base wall 48 of the cylinder housing 12 and forms the run surface for a sealing element 50 known in itself which is attached to the piston 16, has an annular form and comprises an elastomer. Close to the base wall 48 finally the cylinder housing 12 has a pressure connection 42 via which a pressure chamber 54—which in FIG. 1 is limited to the left by the base wall 48, to the right by the piston 16 and radially outwards by the cylindrical section 46 of the housing bore 14—can be pressurized in the known manner by a hydraulic pressure medium when the slave cylinder 10 is mounted in the motor vehicle in order to exert a force on the piston 16 directed to the right in FIG. 1.

Held in the pressure chamber 54 is a pretension spring 56 in the form of a coil compression spring which with its one end on the left in FIG. 1 rests on the base wall 48 of the cylinder housing 12 while its second end on the right in FIG. 1 lies on a centering element 58 attached to the piston 16 for the sealing element 50, more precisely a spring plate section 60 of the centering element 58 injection molded from plastic. It is clear that the pretension spring 56 thus exerts a pretension force on the piston 16 which tries to move the piston 16 to the right in FIG. 1.

The piston 16 in the embodiments shown is a piston injection-molded from plastic, which can be tilted in the housing bore 14, as is known in principle from application DE 43 31 241 A1 by the applicant. This piston 16 on its face has an annular axial groove 62 open towards the pressure chamber 54 i.e. formed without undercut in which is held the sealing element 50. In the axial groove 62 of the piston 16 the sealing element 50 is held by an annular centering collar 64 of the centering element 58 which projects from the spring plate section 60 of the centering element 58 which in turn is fixed in a suitable manner e.g. via means of adhesive, via a hollow cylindrical fixing section 66 connected to the spring plate section 60 radially inside the centering collar 68, in a cylindrical section of a central recess 68 formed on the piston face 16.

The piston 16 with an outer surface 70 falling away conically or curved towards piston rod 18 in the embodiment shown is formed by injection molding from plastic as one piece with the piston rod 18, the end of which facing away from the piston 16 is formed as a ball head 72. The ball head 72 of the piston rod 18 engages by form fit in a socket dish section 74 of a dust protection cap 76 known in itself and swivellable in relation to the piston rod 18, via which the piston rod 18, in the state of the slave cylinder 10 mounted on the motor vehicle, engages actively on a clutch lever (not shown). The dust protection cap 76 also has a fixing section 80 with a radial groove 78 for the boot 42. The boot 42 surrounding the piston rod 18 at both long ends has a collar 82, 84 projecting radially inwards, of which the one collar 82 shown on the left in FIG. 1 engages in the radial groove 38 formed on the fixing section 40 of the cylinder housing 12 while the other collar 84 on the right in FIG. 1 engages in the radial groove 78 formed on the fixing section 80 of the dust protection cap 76 in order to attach the boot 42 both to the cylinder housing 12 and to the piston rod 18.

FIGS. 2 to 6 show the component forming the piston 16, the piston rod 18 and fixing element 20 without the sealing element 50 and the centering element 58. As FIGS. 2, 3 and 5 in particular show, the piston rod 18 in the embodiment shown, to save weight while retaining sufficient kink resistance over its main length, has an essentially cross-shaped cross section with a core 86 remaining constant in diameter over its length and four profiled webs 88 distributed at equal angular distances on the outer periphery of the core 86, the outer surface 90 of which webs starting from a cylinder section 92 next to the ball head 72 of the piston rod 18 first runs parallel to the center axis of the piston rod 18 before rising over the slope 94 towards piston 16, at the same time as the cross section of-the profile webs increases. As FIGS. 1 and 6 also show, the piston rod 18 at the outer periphery of its core 86, viewed in the longitudinal direction of the piston rod 18 essentially centrally and viewed in the peripheral direction of the piston rod 18 between two adjacent profile webs 88, in each case is fitted with a raised seat in section 96 for the fixing element 20.

The annular fixing element 20, in the embodiment shown also formed as one piece with the piston 16 and piston rod 18 by injection molding from plastic and surrounding the piston rod 18, has an outer ring 98 with a rectangular cross section and a plurality of connecting webs 100—here four at equal angular intervals—which extend radially inwards from the outer ring 98 and which before the first operation of the slave cylinder 10 are each connected via a linear breaking point 102 with the piston rod 18 or more precisely with the seat sections 96. As FIGS. 1, 5 and 6 in particular show, the breaking points 102 between the connecting webs 100 of the fixing element 20 and the seat sections 96 on the piston rod 18 are each formed by a reduction in cross section of the connecting web 100. Each connecting web 100 of the fixing element 20 tapers, essentially V-shaped viewed from top, from the outer ring 98 of the fixing element 20 to the core 86 of the piston rod 18 as is shown in particular in FIGS. 2 and 5 so that the breaking points 102 are relatively narrow, while each connecting web 100 also viewed from the side tapers essentially wedge-like from the outer ring 98 of the fixing element 20 to the core 86 of the piston rod 18, giving relatively thin breaking points 102. The wedge-like tapering of the connecting webs 100 is clear from FIGS. 1, 3 and 6. Due to the cross section reduction described in the connecting webs 100, on application of a predetermined force these can spring by a particular amount in the axial direction of the fixing element 20 or the piston rod 18.

As FIGS. 1 to 4 and 6 also show, the second position area 24 for the fixing element 20, which area is stationary in relation to the piston rod and into which the fixing element 20 can be moved on first operation of the slave cylinder 10, lies close to the piston 16 between the first position of the fixing element 20 on the piston rod 18 and the piston rod 16. In this second position area 24 for the fixing element 20 stationary in relation to the piston rod, is formed a structure or profile with which a structure or profile on the fixing element 20 can be brought into engagement by form fit in order to fix the fixing element 20 in the second position area 24 stationary in relation to the piston rod for further operations of the slave cylinder 10. More precisely in the second position area 24 for the fixing element 20 stationary in relation to the piston rod, a plurality of locking tabs 104 are provided which are also formed on injection molding of the component comprising the piston 16, piston rod 18 and fixing element 20, and with which the connecting webs 100 of the fixing element 20 extending radially inwards from the outer ring 98 of the fixing element 20 and elastic in the axial direction of the piston rod 18 can be locked on first operation of the slave cylinder 10. FIGS. 1 to 4 and 6 also show that in each case six (FIG. 1) or five (FIGS. 2 to 4 and 6) locking tabs 104 are provided on the piston rod 18, viewed in the longitudinal direction of the piston rod 18 behind each other and viewed in the peripheral direction of the piston rod 18 between two adjacent profile webs 88 close to the core 86 of the piston rod 18. A common feature of the two variants of the locking tabs 104 shown firstly in FIG. 1 and secondly in FIGS. 2 to 4 and 6 is that they are formed sawtooth-like where their flanks facing the piston 16 are steeper in relation to the center axis of the piston rod 18 than their flanks facing the ball head 72 of the piston rod 18 which are flatter. When deciding the number, size and position of the locking tabs 104 on the piston rod 18, account must be taken of the necessary release stroke of the slave cylinder 10 and the wear travel and its direction in the drive friction clutch on which the slave cylinder 10 will be used.

In the state of the slave cylinder 10 shown in FIG. 1 before its first operation, the outer ring 98 of its fixing element 20 in its first position on piston rod 18 lies with its end facing away from the piston 16 on an annular abutment surface 106 which is formed on the open end of the housing bore 14 through which the piston rod 18 extends on a collar section 108 of the locking element 32 protruding radially inwards over the housing bore 14, and is held in this rest situation by the pretension spring 56 acting on the piston 16. Next to the flat abutment surface 106 in the radially outward direction is a cylindrical centering surface 110 which is also formed on the collar section 108 of the locking element 32 and centers the fixing element 20 in relation to the locking element 32. As a result the piston rod 18 is held by the fixing element 20 both in a predetermined stroke i.e. axial position in the cylinder housing 12 and in a predetermined angular position in relation to the center axis of the housing bore 14 in the cylinder housing 12.

On first operation of the slave cylinder 10, hydraulic pressure medium in the known manner is pressed through the pressure connection 52 into the pressure chamber 54. As a result in addition to the force of the pretension spring 56 a hydraulically applied force is exerted on the piston 16 which tries to move the piston 16 to the right in FIG. 1. As a result the fixing element or more precisely its outer ring 98 with its end facing away from the piston 16 is pressed with a greater force against the abutment surface 106 on the locking element 32 held firmly on the cylinder housing 12 by means of the peripheral tab 34. If this force exceeds a design force, the fixing element 20 tears away from the piston rod 18 at the breaking points 102 and said piston rod is released from the fixing element 20.

The piston rod 18 is then moved to the right in FIG. 1 by the fixing element 20 held on the centering surface 110 of the locking element 32. During this movement the locking tabs 104 closest to the ball head 72 of the piston rod 18, more precisely their flanks facing away from the piston 16, come to rest on the faces of the connecting webs 100 of the fixing element 20 facing the piston 16 whereupon the connecting webs 100 deflect resiliently in the movement direction of the piston rod 18 i.e. to the right in FIG. 1 and slide over the locking tabs 104 next to the ball head 72 of the piston rod 18 in order to engage between these locking tabs 104 and the next locking tabs 104 in the axial direction. This locking process is now repeated on the next locking tabs 104 in the axial direction until the piston 16 has reached its maximum stroke position in the cylinder housing 12.

If then the pressure chamber 54 is pressure-relieved to end the first operation of the slave cylinder 10, the spring-pretensioned clutch lever (not shown) actively connected with the ball head 72 of the piston rod 18 pushes the piston 16 back via the piston rod 18 against the force of the pretension spring 56 in the direction of the base wall 48 of the cylinder housing 12, i.e. to the left in FIG. 1. The piston rod 18 now carries with it the fixing element 20, now in the second piston area 24 stationary in relation to the piston rod for the fixing element 20 held form fit between locking tabs 104 adjacent in the longitudinal direction of piston rod 18 at the connecting web 100, so that the element moves away from the locking element 32 to the left in FIG. 1.

In this context it should be stated that in the embodiment shown in FIGS. 1 to 7, the slight radial spacing of the connecting webs 100 of the fixing element 20 separated from the piston rod 18 or in other words the radial spacing between breaking points 102 of the fixing element 20 which are opposite in relation to the center axis of the piston rod 18, is selected slightly larger than the diameter of the piston rod core 86 between locking tabs 104 adjacent in the longitudinal direction of piston rod 18 so that the connecting webs 100 of the fixing element 20 can spring back to their original shape after the locking process and the fixing element 20 is held merely form fit at the locking tabs 104. Depending on the fixing requirements a force closure can be overlaid over this form fit if the diameter of the core 86 between locking tabs 104 adjacent in the longitudinal direction of the piston rod 18 is selected slightly larger than the radial distance between breaking points 102 of the fixing element 20 opposite in relation to the center axis of the piston rod 18 so that the connecting webs 100 in their locking position press between locking tabs 104 adjacent in the longitudinal direction of piston rod 18 resiliently against the piston rod 18.

It is clear that the fixing element 20 after the first operation of the slave cylinder 10 always remains in the second position area 24 stationary in relation to the piston rod of the fixing element 20 close to the piston 16 i.e. is held captive there so that a tilt movement of the piston rod 18 in relation to the center axis of the housing bore. 14 in the cylinder housing 12, which movement can in practice be ±5°, is not hindered. The working method and function of the slave cylinder 10 in a hydraulic clutch control are otherwise sufficiently known so that further details are not necessary at this point.

The second embodiment shown in FIGS. 7 to 12 will be described below only insofar as it differs from the first embodiment described with reference to FIGS. 1 to 6 and appears necessary for understanding the second embodiment. In the second embodiment, the same components or those corresponding to the components of the first embodiment carry the same reference numerals as those in the first embodiment.

Figure 7:
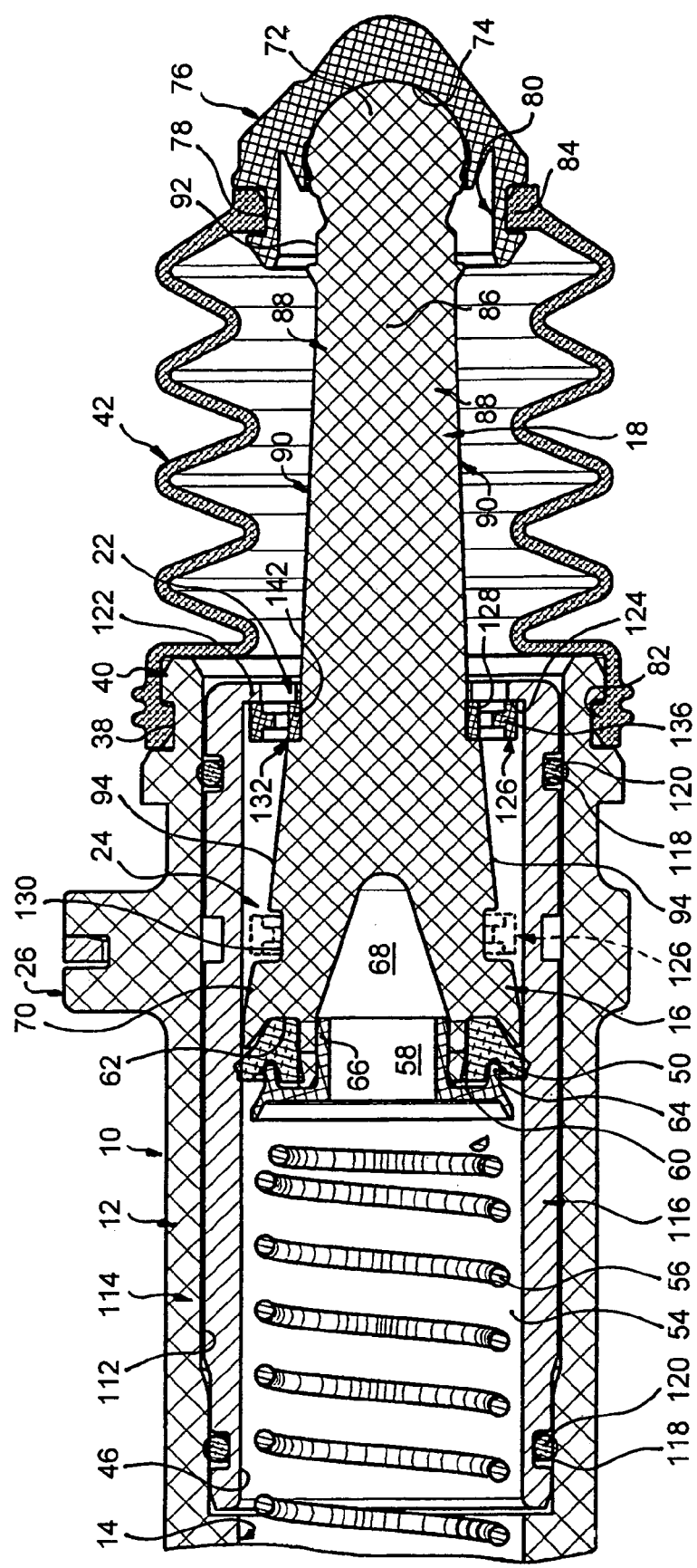

In contrast to the first embodiment, the cylinder housing 12 is formed as several pieces in the second embodiment of the slave cylinder in FIG. 7, with a housing base body 114 made of plastic and having a stepped bore 112 and inserted therein a metal liner 116 with the cylindrical section 46 as a run surface for the sealing element 50 attached to the piston 16. To avoid leaks between the housing base body 114 and the liner 116, the latter on its outer periphery side at both long ends is fitted with a radial groove 118 in which is inserted an O-ring 120 which lies sealing on the inner peripheral surface of the stepped bore 112 in the housing base body 114. At the open end of the cylinder housing 12 i.e. at the right-hand end of the liner 116 in FIG. 7, this has a ring collar 112 protruding radially inwards, the end of which facing the piston 16 forms a flat annular abutment surface 124 for a fixing element 126 which serves the same purpose as the fixing element 20 in the first embodiment. According to the second embodiment, the long end of the slave cylinder 10 not shown in FIG. 7 can otherwise be formed as the left-hand end in FIG. 1 of the slave cylinder 10 according to the first embodiment.

The piston rod 18 of the slave cylinder 10 according to the second embodiment differs from the piston rod 18 of the slave cylinder 10 in the first embodiment essentially in that both the seat sections 96 and the locking tabs 104 of the first embodiment are omitted. Instead the piston rod 18 in the second embodiment is fitted with two seats in the form of peripheral radial grooves 128, 130 made in the profile webs 88, which viewed in the longitudinal direction of the piston rod 18 are spaced at an interval corresponding at least to the release stroke of the dry friction clutch on which the slave cylinder 10 will be used. The radial groove 128 arranged in the center area 22 of the piston rod 18 approximately concentric to but axially space from the piston 16 serves for form fit fixing of a carrier ring 132 which carries the fixing element 126 before first operation of the slave cylinder 10 in its first position as shown in particular by FIG. 7. The radial groove 130 however formed close to the piston 16 in the second position area 24 for the fixing element 126 stationary in relation to the piston rod—the groove base of which has a larger diameter than the groove base of radial groove 128, as indicated with dotted lines in FIG. 7—serves for form fit fixing of fixing element 126 when the slave cylinder 10 is operated for the first time.

As FIGS. 9 to 12 show the fixing element 126 as a component separate from the piston rod 18 which is formed of one piece with the carrier ring 132 by injection molding of plastic. The fixing element 126 itself has an outer ring 136 fitted with a through longitudinal slot 134 which has an essentially T-shaped cross section. Next to the outer ring 136 on the inner periphery side is a plurality of knob-like connecting webs 138, in the embodiment shown four at equal angular intervals in relation to the center axis of the outer ring 136 and extending radially inwards, via which the fixing element 126 is detachably connected with the carrier ring 132. More precisely the connecting webs 138 taper towards the carrier ring 132 such that they are each connected with the carrier ring 132 only via a relatively small cross section which serves as a breaking point 140. As a result in this embodiment too the detachable connection between the piston rod 18 and the fixing element 126 in its first position is achieved by a material fit via breaking points 140 which here however are provided between the fixing element 126 and the carrier ring 132.

Figure 8:
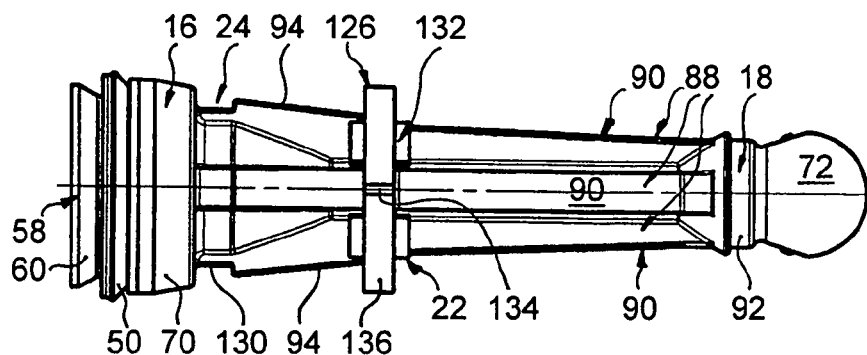

According to FIGS. 9 to 12, the carrier ring 132 arranged concentrically within the outer ring 136 is formed crown-like towards both long ends, with a center ring section 142 and projections 144-extending to the sides thereof. The number (four) and position (at equal angular distances in relation to the center axis of the carrier ring 132) and the dimensions of the projections 144 are selected such that they can hold the carrier ring 132 rotationally stationary on the piston rod 18, where the carrier ring 132 engages only with its ring section 142 in the radial groove 128 on the piston rod 18, while the projections 144 are each held between profile webs 188 of the piston rod 18 adjacent in the peripheral direction of the piston rod 18 as shown in FIG. 8.

Figure 9:
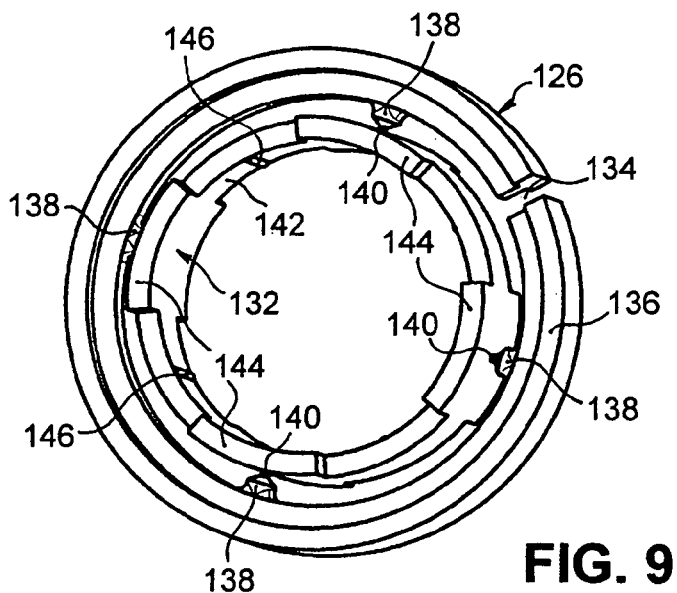
Figure 11:
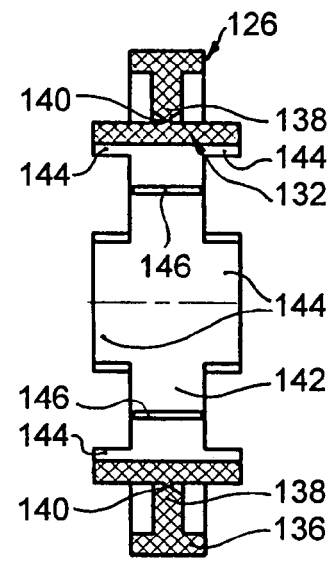
Figure 10:
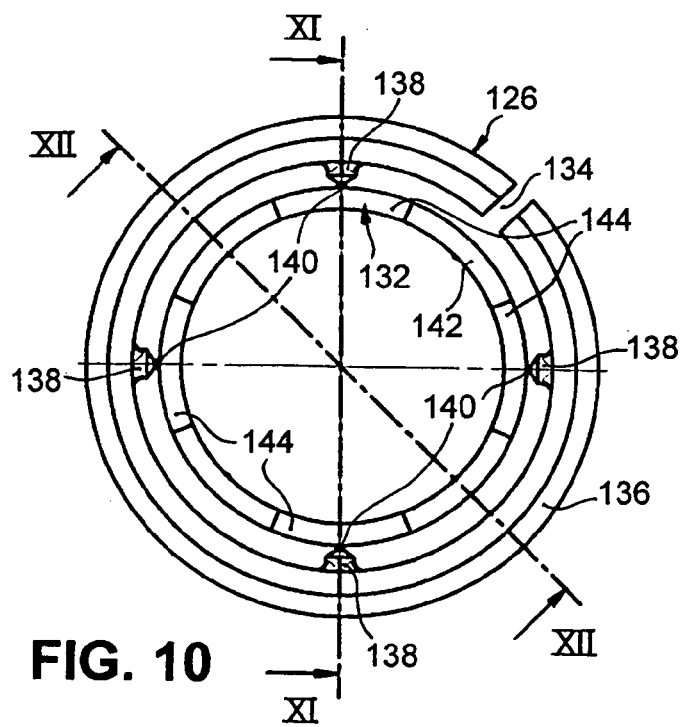
Figure 12:
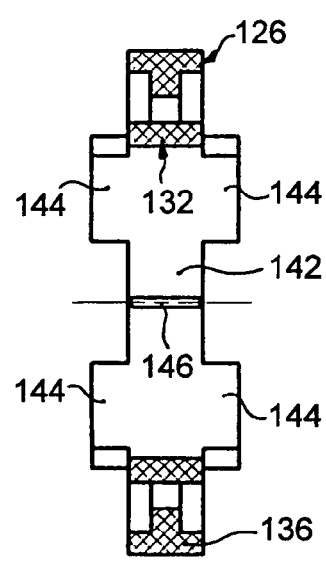

FIGS. 9, 11 and 12 further show strip-like profiles 146 extending in the longitudinal direction of the carrier ring 132 which viewed in the peripheral direction are formed between the projections 144 on the inner periphery of the ring section 142 in order to allow assembly of the component forming the fixing element 126 and its carrier ring 132 on the piston rod 18. As finally in particular FIGS. 11 and 12 show, the component forming the fixing element 126 and its carrier ring 132 is formed symmetrical in relation to an imaginary plane perpendicular to its center axis so that this component can be mounted on the piston rod 18 in either direction.

According to FIG. 7 the fixing element 126 before first operation of the slave cylinder 10 holds the piston rod 18 in a predetermined stroke position where the end of the outer ring 136 of the fixing element 136 facing away from the piston 16, due to the pretension force of the pretension spring 56, is pressed against the abutment surface 124 on the ring collar 122 of the liner 116.

If on first operation of the slave cylinder 10 a pressure builds up in its pressure chamber 54, the fixing element 126 is pressed with greater force against the ring collar 122. If this force exceeds a predetermined design force, the connecting webs 138 of the fixing element 126 shear off from the carrier ring 132 at the breaking points 140 and the piston rod 18 is freed from the fixing element 126.

The fixing element 126 with its outer ring 136, more precisely its inner periphery now come to rest on the slopes 94 of the profile webs 88 rising towards the second position area 24 for the fixing element 126, stationary in relation to the piston rod, of the piston rod 18 moving to the right in FIG. 7 through the fixing element 126. Consequently the slotted fixing element 126 springs radially resiliently until it snap-locks in the peripheral radial groove 128 in the second position area 24 for the fixing element 126, stationary in relation to the piston rod. As a result the fixing element 126 is fixed in the radial groove 128 of the piston rod 18 close to the piston by form fit as shown by dotted lines in FIG. 7 so that towards the end of the first operation of the slave cylinder 10, on the return of the piston 16 the element is moved away from the ring collar 122 to the left in FIG. 7.

It is clear that the fixing element 126 in its second position stationary in relation to the piston rod serves as a stop element which co-operates with the abutment surface 124 of the ring collar 122 as a counterstop stationary in relation to the cylinder housing, so that the stroke of the piston 16 in the housing bore 14 of the housing 12 is limited.

Figure 13:
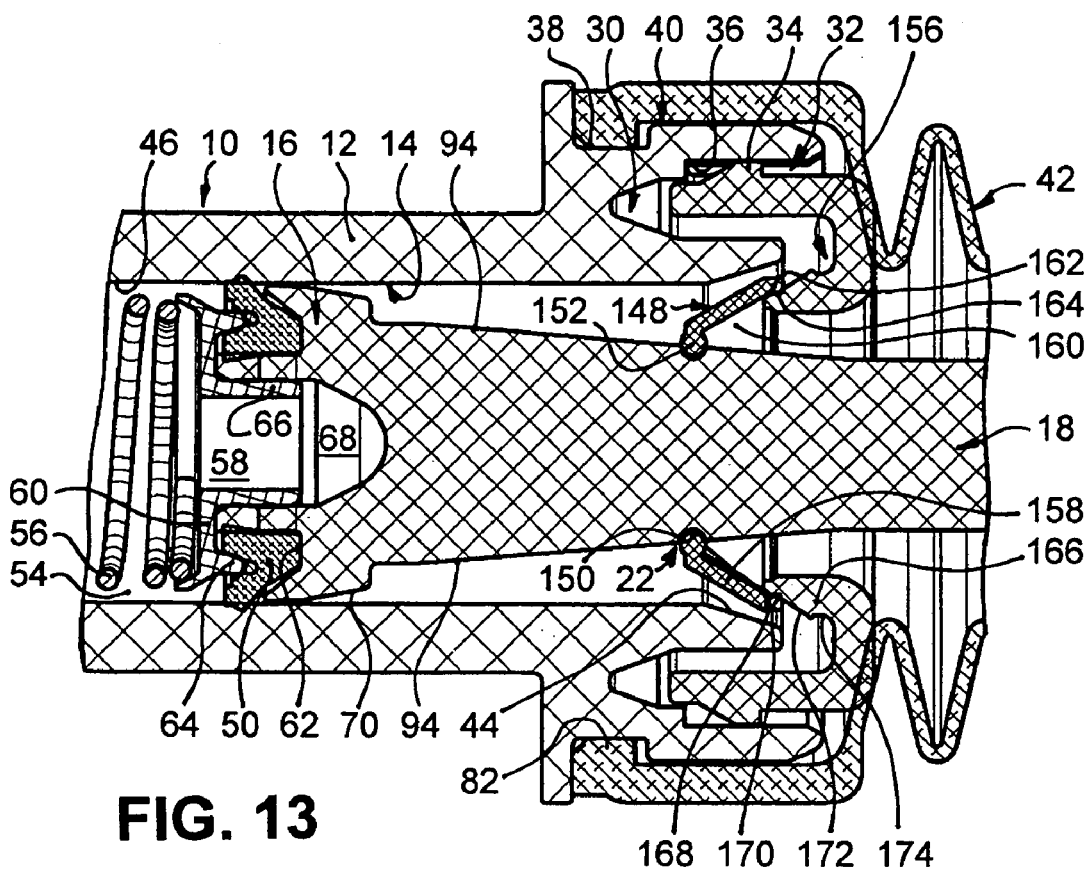
Figure 14:
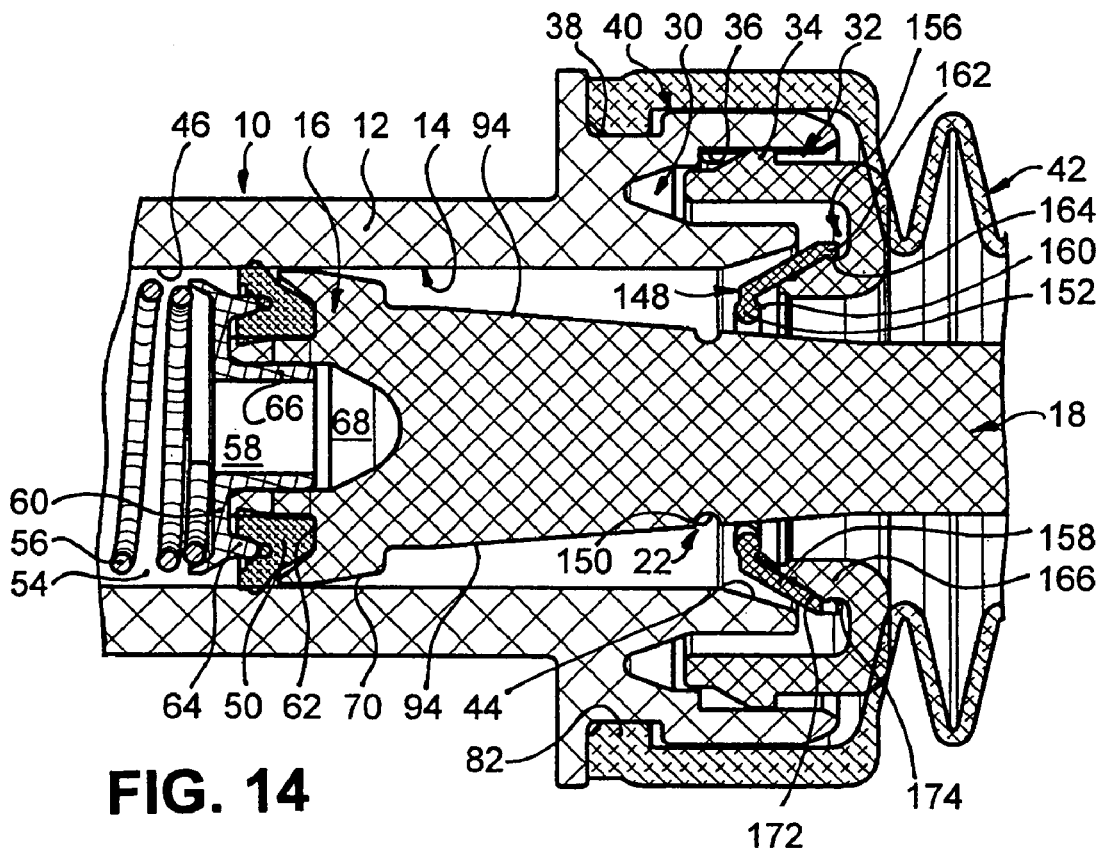

The third embodiment shown in FIGS. 13 to 17 will finally be described below only insofar as it differs from the embodiments described with reference to FIGS. 1 to 12, and as appears necessary for understanding of the third embodiment. In the third embodiment, the same components or those corresponding to the components of the previous embodiments are here given the same reference numerals as the components of the previous embodiments. In FIGS. 13 and 14 the long ends of the slave cylinder 10 are not shown as these can be formed as shown in FIGS. 1 or 7.

In contrast to the previous embodiments, in the slave cylinder 10 according to the third embodiment the detachable connection between a fixing element 148 serving the same purpose as the fixing elements 20, 126 and the piston rod 18 is produced form fit by means of complementary intermeshing structures on the fixing element 148 and on the piston rod 18. The fixing element 148 is designed resiliently so that on application of a force acting in the axial direction of the piston rod 18 and exceeding a predetermined force, the structures move out of engagement under a radial deflection movement of the fixing element 148. More precisely the piston rod 18 in its center area 22 is fitted with a radial groove 150 which has a semi-circular cross section and before first operation of the slave cylinder 10 engages form fit in the complementary-shaped ring section 152 of the fixing element 148. The fixing element 148, as shown in FIGS. 15 and 16, furthermore has an oblique through slot 154 in the longitudinal direction of the fixing element 148 in order to be able to spring radially outwards.

Furthermore in the slave cylinder 10 according to the third embodiment, the second position area 156 for the fixing element 148—in contrast to the previous embodiments—is stationary in relation to the cylinder housing and is located at the open end of the housing bore 14 in the cylinder housing 12 through which the piston rod 18 extends, more precisely the locking element 32 attached there as described with reference to FIG. 1.

Figure 15:
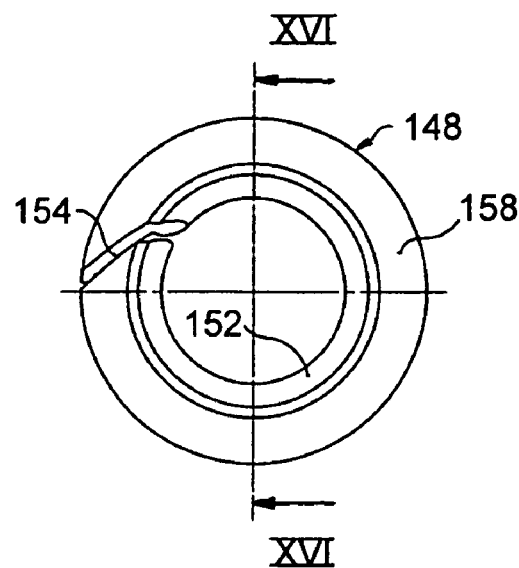
Figure 16:
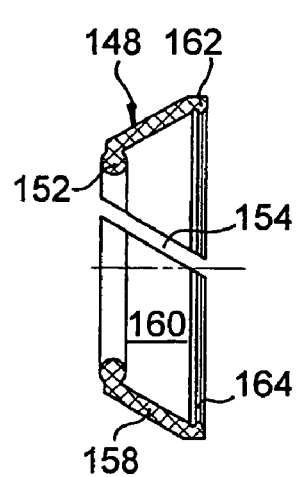

According to FIGS. 15 and 16 next to the ring section 152 of the fixing element 148 is a conical casing section 158 with a slope 160 on the inner periphery side which according to FIG. 13 rises towards the second position area 156 stationary in relation to the cylinder housing. The casing section 158 ends at a fixing section 162 of the fixing element 148 which on the inner periphery side has a peripheral locking tab 164 to fix the fixing element 148 in the second position area 156 stationary in relation to the cylinder housing.

Figure 17:
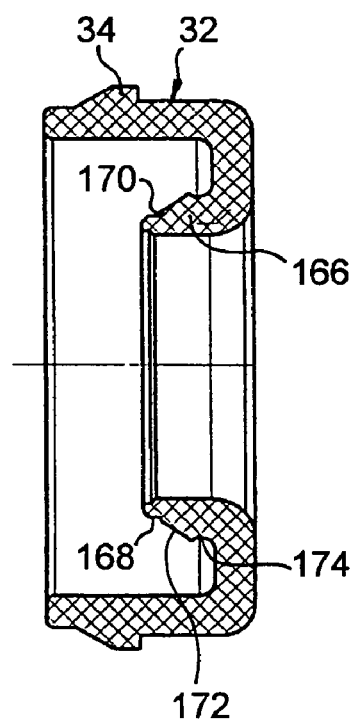

The locking element 32 having an essentially U-shaped cross section according to FIG. 17 however in the third embodiment has an inner ring section 166 protruding into the housing bore 14 of the cylinder housing 12. On the outer periphery of the inner ring section 166—viewed from left to right in FIG. 17—are formed a cylindrical centering surface 168 for the fixing element 148 in its first position, a flat annular abutment surface 170 for the fixing element 148 in its first position, a joint slope 172 for the fixing element 148 on its movement to the second position area 156 stationary in relation to the cylinder housing, which slope is steeper towards the center axis than the slope 160 on the fixing element 148, and an undercut 174 for form fit fixing of the fixing element 148 in the second position area 156 stationary in relation to the cylinder housing.

Before first operation of the slave cylinder 10 according to the third embodiment, the piston rod 18 is tied in a predetermined stroke position in relation to the cylinder housing 12 by means of the fixing element 148, the ring section 152 of which engages form fit in the radial groove 150 on the piston rod 18. The fixing element 148 with its fixing section 162, more precisely its end facing away from the piston 16, is pressed by means of the pretension force exerted by the pretension spring 56 on the piston 16 against the abutment surface 170 of the locking element 32. Also the piston rod 18 is held via the fixing element 148, the locking tab 164 of which lies on the centering surface 168 of the locking element 32, in a position aligned to the center axis of the housing bore 14 of the cylinder housing 12.

On first operation of the slave cylinder 10 the piston 16 is also pressurized hydraulically with a force trying to move the piston 16 to the right in FIG. 13. Consequently the ring section 152 of the slotted fixing element 148 moves under radial expansion slightly out of the radial groove 150 in the piston rod 18. The locking tab 164 of the fixing element 148 springs out of the centering surface 168 of the locking element 32 onto its joint slope 172.

The piston rod 18 can now move relative to the cylinder housing 12 and carries the fixing element 148 with it to the right in FIG. 13. Here the slotted fixing element 148 is continuously expanded when the locking tab 164 rests on the joint slope 172 of the locking element 32 until the locking tab 164 of the fixing element 148 engages or snap-locks into the undercut 174 of the locking element 32. On return of the piston 16 towards the end of the first operation of the slave cylinder 10 and on further operations of the slave cylinder 10, the fixing element 148 is now held form fit on the locking element 32 so that piston rod 18 is released and is freely mobile in the axial direction. This situation is shown in FIG. 14.

Although in the embodiments shown the piston rod 18 is throughout formed of one piece with the piston 16, it is clear to the expert that the detachable tying described above of the piston rod 18 to the cylinder housing 12 by means of fixing element 20, 126 or 148 can self-evidently also be used on piston rods which engage loosely in an allocated recess in the piston or which are connected form fit with the piston for example by means of a ball joint.

The slave cylinders 10 described above can be used in both prefilled and in non-prefilled hydraulic clutch controls where in both cases they simplify assembly of the slave cylinder 10 in the motor vehicle, in particular in that due to the fixing elements 20, 126 or 148 tying the piston rod 18 in a predetermined position in relation to the cylinder housing 12, firstly the piston rod 18 need not be moved against the force of the pretension spring 56 of the slave cylinder 10 in the axial direction into the cylinder housing, and secondly the piston rod 18 is also held in a fixed angle position in relation to the center axis of the housing bore 14 so that the piston rod 18 need not be awkwardly aligned manually. Even after first operation of the slave cylinder 10 the fixing element 20, 126 or 148 remains an integral part of the slave cylinder 10 which always leaves untouched the operating end of the piston rod 18 facing away from the piston 16.

A hydraulic cylinder is disclosed comprising a cylinder housing with a housing bore, a piston held longitudinally displaceably in the housing bore, a piston rod allocated to the piston and a fixing element which is connected detachably with the piston rod before first cylinder operation, and fixes this in a predetermined stroke position in relation to the cylinder housing and is designed to release the piston rod in relation to the cylinder housing on cylinder first operation. According to the invention the fixing element, before first operation of the cylinder, in a first position is detachably connected with a central area of the piston rod and on first cylinder operation can be moved from the first position into a second piston area in particular stationary in relation to the piston, in which it can be fixed for further cylinder operations. The result is a simple design of hydraulic cylinder in which the fixing element provided for temporary tying of the piston rod in particular leaves untouched the end of the piston rod facing away from the piston and does not hinder the further operation of the hydraulic cylinder.

Other variations are possible without departing from the spirit and scope of the invention as defined in the following claims.

The invention claimed is:

1. A hydraulic cylinder with a cylinder housing having a housing bore, a piston held longitudinally displaceably in the housing bore, a piston rod allocated to the piston; said piston rod having two end areas, one extending toward the piston and the other extending away from the piston, and an axial center area which lies between the end areas of the piston rod, and a fixing element which before first operation of the hydraulic cylinder is detachably connected with the piston rod and fixes the piston rod in a predetermined stroke position in relation to the cylinder housing and which is designed, on first operation of the hydraulic cylinder, to release the piston rod in relation to the cylinder housing, wherein the fixing element before first operation of the hydraulic cylinder is detachably connected with the center area of the piston rod in a first position of the fixing element relative to the piston rod and on first operation of the hydraulic cylinder, said fixing element constructed to move from the first position into a second position area relative to the piston rod, not including the first position and stationary in relation to the piston rod or the cylinder housing, in which second position area the fixing element is fixed for further operations of the hydraulic cylinder.

2. A hydraulic cylinder according to claim 1, wherein the fixing element is annular and surrounds the piston rod.

3. A hydraulic cylinder according to claim 1, wherein the detachable connection between the fixing element and the piston rod is created in particular by material fit via at least one breaking point between the fixing element and the piston rod or a carrier ring holding the fixing element in the first position on the piston rod.

4. A hydraulic cylinder according to claim 3, wherein the fixing element has an outer ring and a plurality of connecting webs extending radially inwards from the outer ring which before first operation of the hydraulic cylinder are each connected as one piece via the breaking point with the piston rod or said carrier ring provided within the outer ring as carrier, which in the first position is arranged on a seat on the piston rod.

5. A hydraulic cylinder according to claim 4, wherein the breaking points are each formed by a cross section reduction of the connecting web concerned between the outer ring and the piston rod or the carrier ring as carrier.

6. A hydraulic cylinder according to claim 5, wherein the carrier ring is arranged concentric within the outer ring.

7. A hydraulic cylinder according to claim 6, wherein the fixing element in its first position lies on an abutment surface which is formed at an open end of the housing bore of the cylinder housing through which the piston rod extends, on a ring collar of the cylinder housing or an insert attached there.

8. A hydraulic cylinder according to claim 3, wherein the fixing element in its first position lies on an abutment surface which is formed at an open end of the housing bore of the cylinder housing through which the piston rod extends, on a ring collar of the cylinder housing or an insert attached there.

9. A hydraulic cylinder according to claim 1, wherein the fixing element in its first position lies on an abutment surface which is formed at an open end of the housing bore of the cylinder housing through which the piston rod extends, on a ring collar of the cylinder housing or an insert attached there.

10. A hydraulic cylinder according to claim 1, wherein the detachable connection between the fixing element and the piston rod is created by form fit by means of complementary intermeshing structures on the fixing element and on the piston rod, where wherein the fixing element and/or the piston rod is formed resilient so that on application of a force acting in the axial direction of the piston rod and exceeding a predetermined force, the structures move out of engagement under a radial deflection movement of the fixing element and/or piston rod.

11. A hydraulic cylinder according to claim 10, wherein the piston rod in its center area is fitted with a radial groove which has a semi-circular cross section and in which before the first operation of the hydraulic cylinder there engages by form fit a complementary-shaped ring section of the fixing element, the fixing element having a through slot in the longitudinal direction in order to be able to spring resiliently radially outwards.

12. A hydraulic cylinder according to claim 11, wherein the fixing element in its first position lies on an abutment surface which is formed at an open end of the housing bore of the cylinder housing through which the piston rod extends, on a ring collar of the cylinder housing or an insert attached there.

13. A hydraulic cylinder according to claim 1, wherein the second position area stationary in relation to the piston rod for the fixing element lies close to the piston between the first position of the fixing element on the piston rod and the piston.

14. A hydraulic cylinder according to claim 1, wherein the second position area stationary in relation to the cylinder housing for the fixing element lies at an open end of the housing bore in the cylinder housing through which the piston rod extends.

15. A hydraulic cylinder according to claim 1, wherein in the second position area for the fixing element stationary in relation to the piston rod or cylinder housing is formed a structure with which a complementary-shaped structure on the fixing element can be brought into form fit engagement in order to fix the fixing element for further operations of the hydraulic cylinder.

16. A hydraulic cylinder with a cylinder housing having a housing bore;
a piston held longitudinally displaceably in the housing bore;
a piston rod allocated to the piston and a fixing element which before first operation of the hydraulic cylinder is detachably connected with the piston rod and fixes the piston rod in a predetermined stroke position in relation to the cylinder housing and which is designed, on first operation of the hydraulic cylinder, to release the piston rod in relation to the cylinder housing;
wherein the fixing element before first operation of the hydraulic cylinder in a first position is detachably connected with a center area of the piston rod and on first operation of the hydraulic cylinder said fixing element is constructed to move from the first position into a second position area stationary in relation to the piston rod or the cylinder housing, in which position area it is fixed for further operations of the hydraulic cylinder; and
wherein in the second position area for the fixing element stationary in relation to the piston rod, a plurality of locking tabs is provided with which can engage connecting webs of the fixing element which extend radially inwards from an outer ring of the fixing element and which are formed resilient in the axial direction of the fixing element.

17. A hydraulic cylinder according to claim 15, wherein the piston rod in the second position area for the fixing element stationary in relation to the piston rod, is fitted with a peripheral radial groove in which can be snap-locked the fixing element, for which the fixing element is fitted with a through slot in its longitudinal direction while the piston rod has at least one slope rising towards the second position area stationary in relation to the piston rod, by means of which slope the fixing element on first operation of the hydraulic cylinder can spring radially to create the snap-lock connection.

18. A hydraulic cylinder according to claim 15, wherein the cylinder housing at an open end of the housing bore through which the piston rod extends or an insert attached there, in the second position area for the fixing element stationary in relation to the cylinder housing, is fitted with an undercut in which can be snap-locked a locking tab formed on the fixing element, wherein the fixing element is fitted with a through slot in its longitudinal direction while on the cylinder housing side is provided a joint slope rising towards the second position area stationary in relation to the cylinder housing, via which slope the fixing element on first operation of the hydraulic cylinder can spring radially to create the snap-lock connection.

19. A hydraulic cylinder according to claim 18, wherein the fixing element in its second position stationary in relation to the piston rod or cylinder housing serves as a stop element which co-operates with a counterstop stationary in relation to the piston rod and cylinder housing respectively in order to limit the stroke of the piston in the housing bore of the cylinder housing.

20. A hydraulic cylinder with a cylinder housing having a housing bore;
a piston held longitudinally displaceably in the housing bore;
a piston rod allocated to the piston and a fixing element which before first operation of the hydraulic cylinder is detachably connected with the piston rod and fixes the piston rod in a predetermined stroke position in relation to the cylinder housing and which is designed, on first operation of the hydraulic cylinder, to release the piston rod in relation to the cylinder housing;
wherein the fixing element before first operation of the hydraulic cylinder in a first position is detachably connected with a center area of the piston rod and on first operation of the hydraulic cylinder can be moved from the first position into a second position area stationary in relation to the piston rod or the cylinder housing, in which position area it can be fixed for further operations of the hydraulic cylinder; and
wherein the fixing element in its second position stationary in relation to the piston rod or cylinder housing serves as a stop element which co-operates with a counterstop stationary in relation to the piston rod and cylinder housing respectively in order to limit the stroke of the piston in the housing bore of the cylinder housing.

21. A hydraulic cylinder assembly with a cylinder housing having a housing bore, a piston held longitudinally displaceably in the housing bore, a piston rod allocated to the piston extending toward extending an elastomeric boot attached to the cylinder housing and surrounding said piston rod to prevent dirt from entering the confines within the boot and cylinder housing; said hydraulic assembly characterized by:
- a fixing element positioned within the confines of the elastomeric boot and cylinder housing and hydraulic cylinder being detachably connected with the piston rod and fixing the piston rod in a predetermined stroke position in relation to the cylinder housing and elastomeric boot and which is designed, on first operation of the hydraulic cylinder, to release the position rod in relation to the cylinder housing;
- wherein the fixing element before first operation of the hydraulic cylinder is detachably connected with a first position with the piston rod; and
- on first operation of the hydraulic cylinder said fixing element is constructed to move from the first position into a fixed second position stationaly in relation to the piston rod or the cylinder housing within the confines of the cylinder housing and boot for further operations of the hydraulic cylinder.

22. A hydraulic cylinder assembly as defined in claim 21 further comprising:

said eleastomic boot having one end connected to the cylinder housing and another end affixed to a dust cap that is mounted at a distal end of said piston.

\* \* \* \* \*

UNITED STATES PATENT AND TRADEMARK OFFICE
CERTIFICATE OF CORRECTION

PATENT NO. : 7,216,752 B2  Page 1 of 1
APPLICATION NO. : 10/934148
DATED : May 15, 2007
INVENTOR(S) : Hubert Derra et al.

It is certified that error appears in the above-identified patent and that said Letters Patent is hereby corrected as shown below:

In the Claims
Claim 21, Col. 19, Line 14    After "release the" delete [position], insert --piston--
Claim 21, Col. 20, Line 3     After "position" delete [stationaly], insert --stationary--

Signed and Sealed this

Twenty-fourth Day of June, 2008

JON W. DUDAS
*Director of the United States Patent and Trademark Office*